United States Patent [19]
Cirami

[11] Patent Number: 4,976,218
[45] Date of Patent: Dec. 11, 1990

[54] PREPACKAGED, DISPOSABLE, CAT LITTER BOX

[76] Inventor: Salvatore Cirami, 12-21 35th Ave., Apt. 4F, Long Island City, N.Y. 11106

[21] Appl. No.: 456,356

[22] Filed: Dec. 26, 1989

[51] Int. Cl.[5] .......................................... A01K 67/00
[52] U.S. Cl. ................................................ 119/168
[58] Field of Search ................... 119/1; 220/401, 408, 220/449

[56] References Cited

U.S. PATENT DOCUMENTS

| | | | |
|---|---|---|---|
| 4,014,292 | 3/1977 | Coughlin et al. | 119/1 |
| 4,548,160 | 10/1985 | Feitelson | 119/1 |
| 4,628,863 | 12/1986 | Eichenauer | 119/1 |
| 4,782,788 | 11/1988 | Arcand | 119/1 |
| 4,788,935 | 12/1988 | Balla et al. | 119/1 |
| 4,846,103 | 7/1989 | Brown | 119/1 |

*Primary Examiner*—Gene Mancene
*Assistant Examiner*—R. Thomas Price

[57] ABSTRACT

An open top, waterproof, cardboard box has an elongated rectangular bottom bordered by side and end panels which extend the length and width, respectively, of the bottom and are joined to form closed corners. Each side panel has a pair of wing portions between which a central portion of the side panel extends, the wing portions being defined by a pair of diagonal fold lines each of which intersects with a corner of the box. The end panels are folded so that they lie nearest the bottom of the box and the side panels are folded over and lie flat against the end panels, the wing portions being folded first with the end panels and then with the side panels whereby the wing portions are finally folded under the central portion of the side panels. The wing portions thereby acquire a fold bias that causes the central portion of each side panel to lean outwardly when the side and end panels are unfolded, allowing the box to have a minimum width at its bottom and still provide adequate lateral clearance for a cat to move about within the box. In preferred embodiment the side and end panels fold to form a box having depth sufficient for containment of and includes cat litter material, the end panels fully cover same and the side panels are fastened to the end panels with purchaser-rupturable adhesive or tap which seals the box.

5 Claims, 4 Drawing Sheets

PREPACKAGED, DISPOSABLE, CAT LITTER BOX

BACKGROUND

Disclosure Document No. 241578 dated Dec. 18, 1989, pertains to the subject matter hereof and is incorporated herein by reference.

1. Field of the Invention

This invention pertains to an improved disposable cat litter box.

2. Description of the Prior Art

The conventional cat litter box, purchasable in a pet shop or supermarket, comprises a plastic tray (measuring approximately 16" long by 12" wide and 5" deep) of durable construction intended for long term use and which may or may not be provided with a dome-like cover. Conventional practice is for the cat owner to purchase a bag of cat litter material the weight and bulkiness of which in one's shopping bag one must take into consideration if simultaneously making other purchases, especially if not traveling by car. At home, the cat owner pours some (or all, depending on bag size purchased) of the litter material into the plastic litter box and shakes same to evenly distribute it therein (to a minimum useful depth of about one inch); the remainder, if any, being kept stored for future use.

Accordingly, conventional litter boxes must be prepared for use and, after each period of use, must be emptied, preferably cleaned and necessarily refilled. It is a notoriously unpleasant task, to such degree that it is not uncommon for members of the household, particularly the younger ones, to dispute whose turn it is to clean the litter box.

First, of course, as already described, the tray must be prepared for use by pouring litter material into it. Unless a dust-suppressing brand of litter material is used (costing up to twice as much as the cheapest form of the product), a suffocating dust rises when the litter material is poured into the tray. The dust must be suffered a second time when the tray is emptied, at which time it is especially offensive because it then reeks of the cat waste it has absorbed; justifying, for those who can afford its running cost, the substantially higher price of litter material containing a dust-suppressing additive.

Volunteers to empty the litter box are frequently difficult to obtain because it seldom dumps entirely clean—damp clumps of the used litter material will stubbornly stick to the bottom or sides of the tray and can be removed only by use of a scraping tool to force the smelly stuff out. And sometimes the cat will have missed the litter material altogether and deposited feces directly on the sides of the tray or on an area of the bottom from which the cat has dug away the litter material in the course of characteristically preparing a hole for depositing its waste, necessitating an especially unpleasant scraping job and, later, cleaning the scraping tool.

Finally, no matter how thoroughly the assignee scrapes the tray, a foul odor will cling to it which can be removed only by washing the tray with a disinfectant; a task which, due to its nature, one is unhappy to have to do in the kitchen or bathroom sink or tub, or without wearing rubber gloves, or using other than a discardable rag or brush set aside exclusively for that purpose.

Liners are available like those used for lining garbage receptacles except proportioned to fit a litter box, but such liners are themselves severely limited and introduce other problems. As the cat digs the litter material and moves it about in the tray, portions of the liner tend to rise above the surface of the litter material. The result is that the cat winds up depositing urine or feces on the liner where it cannot be dried and thereby deodorized by the litter material and one must suffer its smell and the cat dirtied by its own waste. Moreover, as the cat digs the litter material in an effort to make a hole for depositing its waste, the liner is clawed, producing holes and rips some of which will make their presence known only when the liner is lifted for discard, at which time dried lumps of feces per se as well as feces clumped together with litter material will fall onto the floor, imposing a cleanup chore in addition to cleaning the litter box. Further, liners for cat litter boxes do not have the tall shape that characterizes those used to line trash receptacles but instead reflect the flat proportions of the tray. The shallow proportions of a litter box liner makes it difficult to fully collect its edges when lifting the liner from the tray—there is a tendency for the liner's edges to suddenly and expectedly fall away at one or more points (due to the inherently heavy weight of clay litter material), again causing spillage of material which, by its very nature, is unpleasant to sweep up, especially with a broom one uses generally.

It has previously been proposed to avoid all the limitations described above through use of a disposable cat litter box, made of waterproof cardboard initially folded into an relatively flat box prepackaged with litter material, which, when opened by the purchaser unfolds to form a litter box, and which, after its period of use, is discardable in entirety together with its added contents. A number of specifically different constructions have previously been proposed, most pertinent of which appear to be those disclosed in U.S. Pat. Nos. 4,014,292, 4,548,160, 4,628,863, 4,782,788, 4,788,935 and 4,846,103. But these, and other prior proposals, are limited in one or more respects. In some instances the box is folded in a rather complicated way which appears to add unnecessarily to manufacturing cost and is not instantly usable after opening the box because requiring refolding of panels in a certain way (e.g., U.S. Pat. Nos. 4,548,160 and 4,628,863). Others introduce inconvenience to the extent of requiring erecting the panels and then drawing a plastic bag over them (which the cat may tear) to form an enclosed litter box (e.g., U.S. Pat. Nos. 4,788,935 and 4,846,103). Some provide the litter material contained in a plastic bag which must then be emptied into the box (e.g., U.S. Pat. Nos. 4,014,292 and 4,788,935), or require reliance on accessory devices, such as, for example, the brace needed to hold the panels fully open as shown in U.S. Pat. No. 4,014,292. Finally, no prior art is known to provide a disposable litter box wherein, when unfolded, the longer side panels lean outwardly beyond the width of the box's bottom so that, during its period of use, adequate room is provided for the cat to move about within the box, but, in folded configuration as when on a store's shelf or during storage, the box has more compact proportions.

Gift boxes are commonly available which comprise similar upper and lower parts, one of which parts forms a cover for the other, and both of which parts are commonly sold in initially flattened condition for opening by the purchaser to form an open-top box and a similar box that is turned upside down to form a cover that slidably engages the lower box. Either of such boxes provides a rectangular bottom panel (which may be elongated) bordered by foldable side and end panels which are initially provided folded overlying the bottom panel. Adjacent side and end panels form an open-top box having closed corners and the end panels are folded along lateral fold lines which are contiguous with diagonal fold lines formed in the adjacent side panels, which diagonal fold lines are thereby given a certain fold bias. But, the side panels are folded first, and the end panels are folded overlying the side panels, which attains a result that is the opposite of that attained by the invention disposable litter box. In the case of the gift boxes, the fold bias of the diagonal fold lines is such that when the side panels are pulled to open position they lean inwardly. This is useful for a gift box which comprises two parts because it maximizes friction therebetween when the cover part is fully closed upon the bottom part, but is not useful for a litter box that comprises only one part because the inward lean of the side panels (i) excessively reduces the space allotted for the cat to move about within the box, and (ii) results in the cat making deposits on the outboard surfaces of the side panels.

A similar limitation characterizes the disposable litter box disclosed in U.S. Pat. No. 4,014,292, which most nearly approaches the construction disclosed herein, but which depends upon the use of "J-shaped channels ... " to embrace the top edge of each side wall" for the purpose of preventing the otherwise inward lean of the side walls toward each other.

No more pertinent prior art is presently known.

SUMMARY OF THE INVENTION

The invention provides a prepackaged, disposable, cat litter box that:

(1) has an elongated rectangular bottom;
(2) is made of cardboard for disposability;
(3) cardboard that is waterproof to resist disintegration by cat waste products;
(4) contains a minimum useful depth of cat litter material sufficient only for a short period of use not extended by sifting out of solid waste;
(5) has opposed side and end panels adjacent ones of which are contiguous along their full corresponding height to form an open-top box having fully closed corners that prevent throwout of litter material; but which,
(6) are initially folded over so as to fully cover the litter material and form an initially relatively flat box that
 (i) maintains the litter material evenly distributed therein so that no dust from the litter material is raised when the box is opened for use, and,
 (ii) is compact for minimum-space stocking at point of sale and convenient carriage to point of use;
(7) is secured in closed condition by purchaser-rupturable means;
(8) has its side and end panels unfoldable to form a box deep enough for use as a cat litter box; wherein,
(9) the side panels lean outwardly to provide—within the context of Item 1 listed above—sufficient lateral clearance that (i) the cat can freely move about within the box and (ii) the cat cannot make any deposit on the external side of the side panels; and,
(10) the side and end panels are refoldable to fully re-cover the litter material together with the waste products added by the cat, for (i) discard of the box and its total contents, in entirety, (ii) without raising raising dust from the used litter material.

The invention, in its best mode of attainment described above, provides an ultimate solution to the problems described above.

Of course, a lesser solution is offerable—one providing the box without the litter material with corresponding loss of convenience and dust being raised during filling, and a still-lesser solution providing such a non-prepackaged box having its foldable panels closing in a manner not fully covering the used contents, with corresponding loss of function to the extent of dust being again raised during discard.

Accordingly, an object of the invention is to provide a disposable waterproof cardboard litter box wherein:

the box is made from a sheet of cardboard that is thin enough to be foldable as described below, stiff enough that when the box is opened it maintains the desired configuration and plasticized at least on one side to resist disintegration by the cat's waste products—cardboard similar to that used for making heavier weight cardboard milk containers;

the sheet of waterproof cardboard defines an elongated bottom panel bordered by an opposed pair of foldable side panels and an opposed pair of foldable end panels;

adjacent side and end panels are contiguous along their full corresponding height to form a box having four corners rising from the four corners of the bottom panel which corners are fully closed to prevent throwout of litter material by the cat;

but wherein: such box is provided in folded condition with its above-described closed corners turned outside inward, with its end panels folded along a fold line that is contiguous at opposite ends thereof with diagonal fold lines formed in the adjacent side panels so that the diagonal fold lines have a fold bias that causes the side panels to lean outwardly when the side and end panels are pulled to their open or upright position, and with its side panels folded overlying the folded end panels.

A further object is to provide a disposable waterproof cardboard litter box as above wherein the foldable end panels in their folded position reach each other intermediate the length of the bottom panel and the foldable side panels in their folded position reach each other intermediate the width of the bottom panel, and wherein fixed side/end panels are interposed between the bottom panel and the foldable side/end panels, respectively; the fixed side and end panels having a uniform height (approx. one inch) suitable for containment of and the box containing litter material; the folded foldable side panels being secured to the folded foldable end panels by means sealing the package against spillage of litter material but easily rupturable by the purchaser at point of use—said means being preferably similar to that used to seal the openable end of cardboard milk containers, or, alternatively, by means of a tape that is to be cut or a tape that includes a tear string.

The invention disposable litter box in prepackaged embodiment is put to use simply by unsealing and pulling open its foldable side and end panels, forming a litter box of useful depth with the litter material already in it. After its period of use, the foldable end panels are closed first, whereby the contents of the box are fully covered, the foldable side panels are closed over the folded end panels and, while the box is held closed in that manner, it is placed in a trash receptacle.

No suffocating dust was raised initially because the litter material was already in the box and evenly distributed therein. No now smelly dust was raised from the used litter material because it is covered by the foldable end panels and such coverage is reinforced by the foldable side panels when placed in the trash receptacle. Any clawing damage that may have been done to the box by the cat is now tolerable because clearly visible on cardboard and therefore spillage therefrom easily avoidable merely by holding the box appropriately. The previous possibility of touching feces stuck to the insides or rim of the box is now eliminated since the box, during discard, is handled only by its external surfaces, which are clean, and close to cover the soiled inner surfaces. No matter how bad a mess the cat has made, the cat owner can now be quite unconcerned, because the box is simply closed and discarded in entirety and a new one opened.

The invention thereby reduces litter box maintenance to a matter merely of opening a box and placing it on the floor, and later, closing the box and placing it in a trash receptacle—a measure of convenience great to make it practical to bring the cat along when traveling, along with several such boxes.

BRIEF DESCRIPTION OF THE DRAWINGS

FIGS. 1–4 are views from a common perspective of the invention prepackaged waterproof cardboard disposable litter box in various configurations ranging from:

FIG. 1 which shows it in its initial configuration at point of purchase (and storage at home) forming a relatively flat box;

FIG. 2 which shows it partially opened to the extent of its foldable side panels having been unsealed and pulled upright;

FIG. 3 which shows it with one of its foldable end panels having been pulled to upright position, which half exposes the litter material contained in the box; and, FIG. 4 which shows it fully opened and in use by a cat.

FIGS. 5–9 are views from a common perspective of the box per se that is utilized to make the above, showing it in a sequence of fabrication ranging from:

FIG. 5 which shows the sheet of waterproof cardboard from which the box is made marked with dashed lines indicating where it will be folded to form a bottom panel bordered by fixed side and end panels which are in turn boarded by foldable side and end panels, respectively;

FIG. 6 which represents the sheet of FIG. 5 first having been folded to form a box having contiguous corners;

FIG. 7 which shows the box of FIG. 6 next having had its foldable end panels folded parallel to the bottom panel—by reverse folding the closed corners so that they are now outside inward and the foldable side panels having temporarily been forced outwardly whereby diagonal fold lines are created in the foldable side panels which diagonal fold lines have the desired fold bias;

FIG. 8 which shows the product of FIG. 7 having had one of its foldable side panels already folded flat against the closed foldable end panels and the other foldable side panel being shown about to be likewise folded; and, FIG. 9 which shows the finished box with its foldable side and end panels pulled open to their in-use position wherein the diagonal fold lines formed in FIG. 7 cause a central portion of the foldable side panels to lean outwardly.

FIGS. 10–12 representing the same embodiment in various configurations ranging from:

FIG. 10 which shows the alternative box in the initially flattened configuration in which it is sold; the box having been folded in the same manner as described in connection with FIGS. 7 and 8 whereby diagonal fold lines are likewise formed in the foldable side panels of the alternative box;

FIG. 11 which shows the sheet of waterproof cardboard from which the alternative box is made marked with dashed lines indicating where it will be folded to form a bottom panel bordered only by foldable side and end panels; and, FIG. 12 which shows the finished alternative box with its foldable side and end panels pulled open to their in-use position wherein the diagonal fold lines formed in the foldable side panels cause them to lean outwardly.

DESCRIPTION OF PREFERRED EMBODIMENTS

Figure 1:
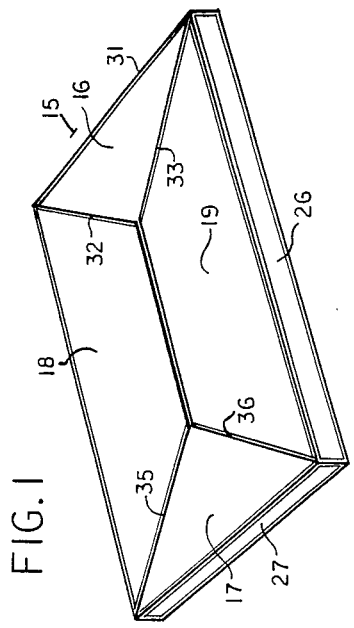
Figure 2:
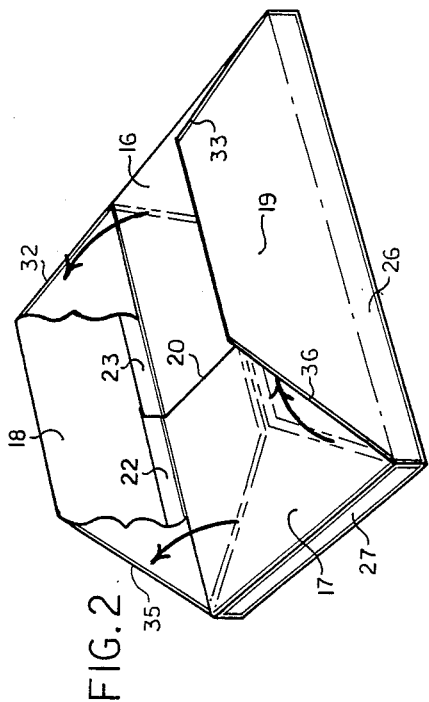
Figure 3:
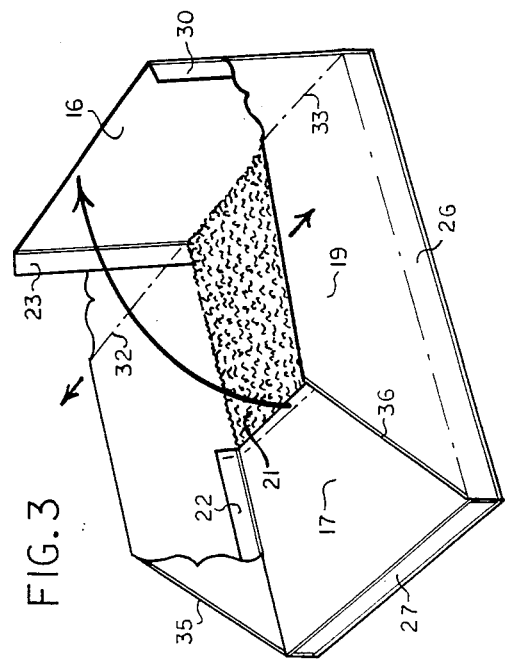
Figure 4:
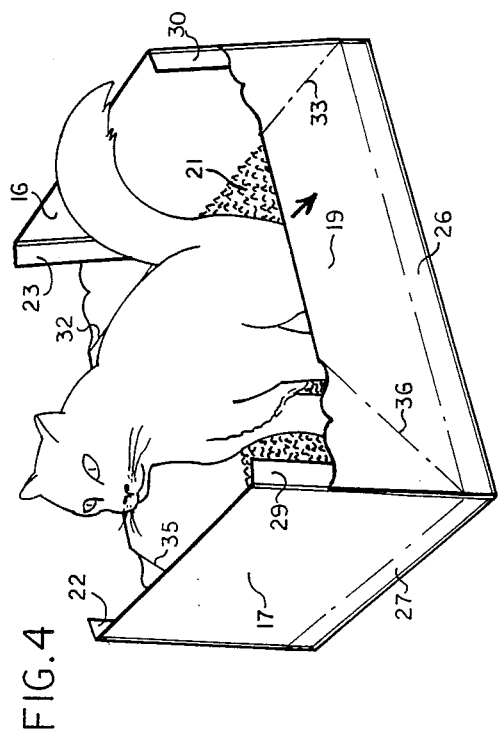

Referring to the accompanying drawings, FIG. 1 shows the invention prepackaged waterproof cardboard disposable litter box indicated generally as 15 in its sealed condition as it would appear at point of purchase. The substantially flat box has foldable end panels 16, 17, and foldable side panels 18, 19, which are secured together by purchaser-rupturable means—preferably in the same manner as the openable end of a cardboard milk carton. The foldable side panels 18, 19, are pulled open first, as shown in FIG. 2 (and indicated by the arrows), and then the foldable end panels are pulled open. FIG. 3 shows the foldable end panel 16 having been pulled open (indicated by the curved arrow) and the foldable end panel 17 still closed. The foldable end panels are tall enough that in their closed position they meet as indicated at 20, FIG. 2 (preferably overlapping and being detachably secured together) intermediate the length of the box. This provides secure containment of the heavy litter material 21, FIGS. 3 and 4, until time of use, and coverage of the used litter material at time of discard. The box has a special fold, such that, when the foldable side and end panels are pulled open, a central portion of the foldable side panels leans outwardly, as indicated by the straight arrows in FIG. 3. The outward lean of the central portion of the foldable side panels provides clearance for the cat, seen in FIG. 4, to move about within the box even though the box's bottom panel has a minimum width, and, prevents the cat from depositing anything on the outboard surfaces of the side panels.

The foldable end panels include tabs, which, when the box is closed (by reverse fold of its corners) are folded under the central portion of the foldable side panels and thereby enhance closure to prevent spillage of contents. See FIG. 4 wherein tabs 22, 23, are in opened position, and FIG. 2 wherein they are in closed position.

Figures 5, 6:
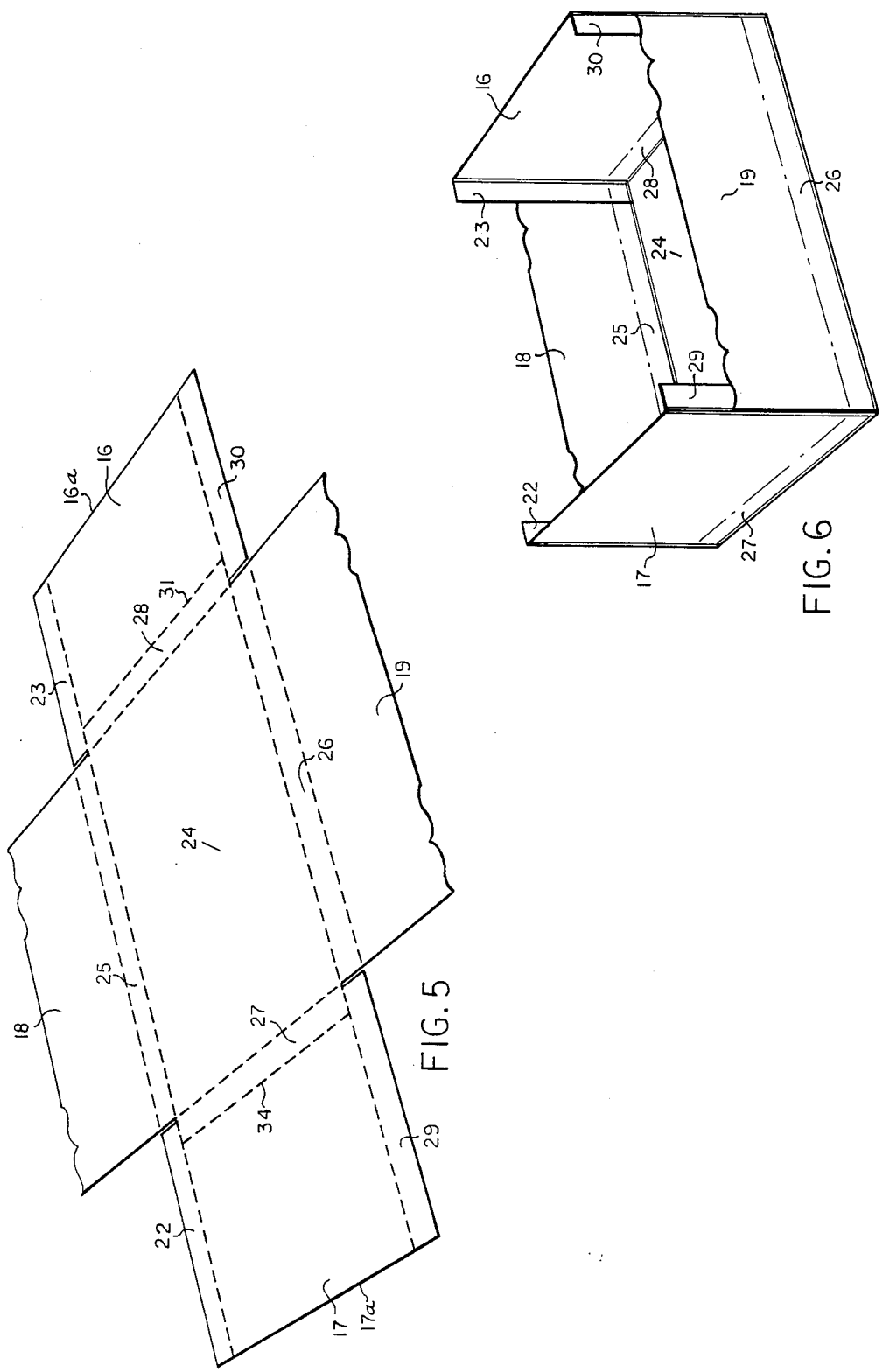

Referring to FIG. 5, the box is made from a sheet of waterproof cardboard defining an elongated rectangular bottom panel 24; first and second fixed side panels 25, 26, having common border with and extending the length of the bottom panel; first and second fixed end panels 27, 28, having common border with and extending the width of the bottom panel; first and second foldable side panels 18, 19, having common border with and extending the length of the first and second fixed side panels 25, 26, respectively; and first and second foldable end panels 16, 17, having common border with and extending the width of the first and second fixed end panels 28, 27, respectively; and finally, tabs 23 and 30 extending fully along one set of end panels and tabs 22, 29 likewise arranged with respect to the other set of end panels.

The sheet of cardboard is folded along the dashed lines shown in FIG. 5 and the tabs 23, 30, at one end, and the tabs 22, 29, at the other end, permanently secured to the adjacent side panels to form the box shown in FIG. 6 having adjacent foldable as well as adjacent fixed side and end panels permanently contiguous, in this construction, utilizing the tabs.

Since, the bottom panel 24 describes an elongated rectangle it thereby has a length greater than its width. The foldable side panels and foldable end panels when folded meet intermediate the length and width, respectively, of the bottom panel. The foldable end panels will therefore necessarily have an unfolded height greater than the unfolded height of the foldable side panels. This is apparent in FIG. 6, where there is a difference in height between the foldable end panels and the foldable side panels. The tabs span that difference in height; i.e., at each corner of the unfolded box, the tab at that corner extends from the elevation of the free edge of the foldable end panel to the wing portion of the foldable side panel such that the corner is continued upwardly without interruption to the free edge of the foldable end panel.

Figure 8:
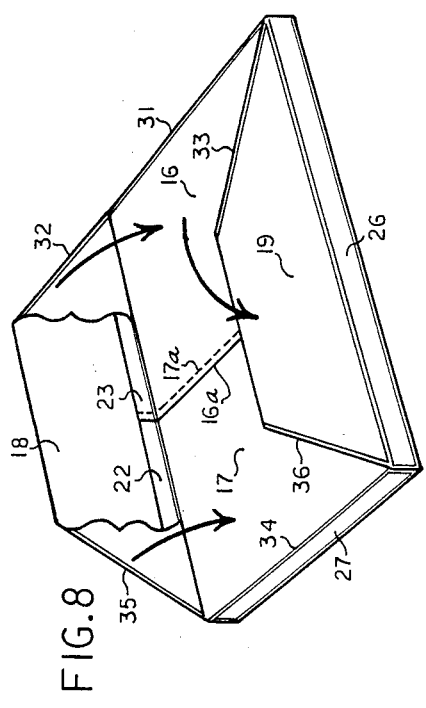
Figure 7:
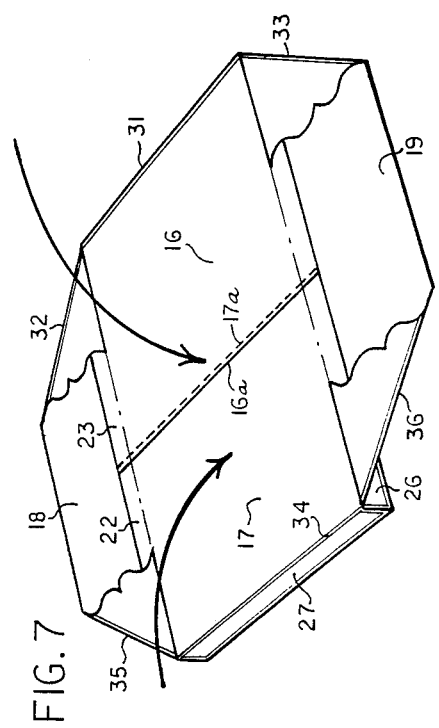

Referring to FIG. 7, the foldable end panels 16, 17, are folded first, as indicated by the arrows in FIG. 7. Each foldable end panel is folded on a lateral fold line that intersects at opposite ends thereof with a diagonal fold line that is formed in each of the adjacent foldable side panels. The diagonal fold lines which are located at opposite ends of each foldable side panel (e.g., 36, 33 on foldable side panel 19) being borders of wing portions of the foldable side panel between which wing portions a central portion of the foldable side panel extends. The novel fold of the box causes the wing portions to acquire a fold bias that causes the central portion of the foldable side panels to lean outwardly when all the foldable panels are in their unfolded position. FIG. 7 shows the foldable end panel 16 having been folded along the lateral fold line 31 which intersects and cooperates with diagonal fold lines 32, 33, formed in adjacent foldable side panels 18, 19, respectively; and foldable end panel 17 having been folded along the lateral fold line 34 which intersects and cooperates with diagonal fold lines 35, 36, formed in adjacent foldable side panels 18, 19, respectively. FIGS. 7 and 8 show the free edge 16a of foldable end panel 16 overlapping the free edge 17a of foldable end panel 17; alternatively, the free edges 16a and 17a may be provided merely meeting and thereby gain the advantage of a smooth surface (i.e., not stepped) which would enhance the seal between same and the foldable side panels. FIGS. 7 and 8 show the free edges 16a, 17a, in overlapped relationship in order to establish that they might be nonpermanently secured together (by means of a purchaser-rupturable adhesive or tape) as further means of ensuring a closure absolutely secure against spillage of litter material however roughly the package is handled.

The foldable side panels are folded last, as shown in FIG. 8 wherein the foldable side panel 19 has been moved 180 degrees (relative to its position in FIG. 7) and is now folded flat overlying the closed foldable end panels 16, 17, and nonpermanently secured thereto (by means of a purchaser-rupturable adhesive or tape); and the foldable side panel 18 having been moved only 90 degrees (relative to its position in FIG. 7) and waiting to be folded flat against and secured to the foldable end panels 16, 17.

Figure 9:
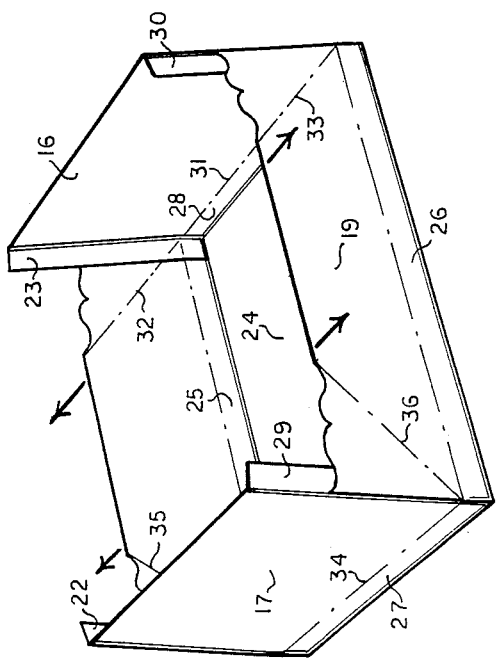

Referring to FIG. 9, when the box is opened, the fold bias of the diagonal fold lines (and thereby the wing portions) causes the central portion of the foldable side panels to lean outwardly, this being indicated by the arrows in FIG. 9, causing the box to assume the uniquely useful shape shown; the box being shown without the litter material in it.

Figure 11:
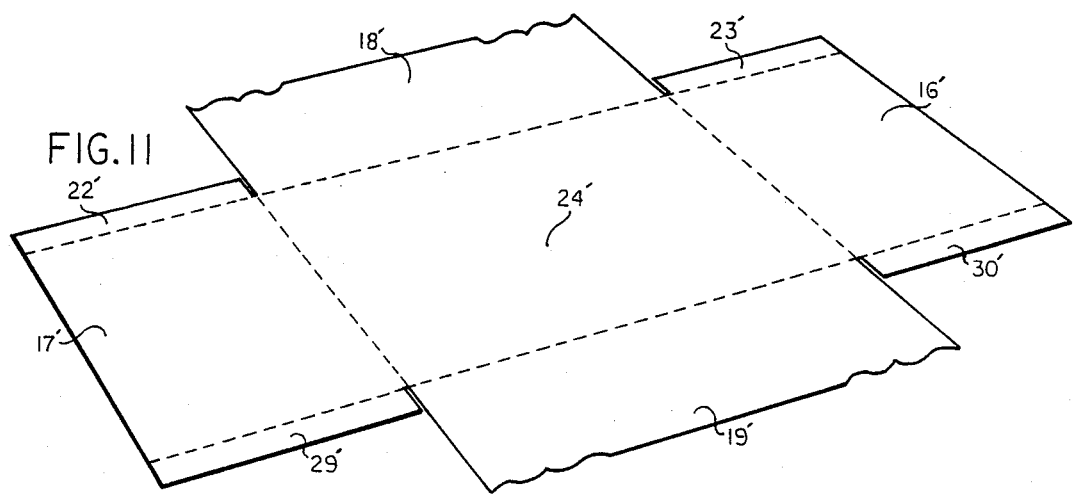
Figure 12:
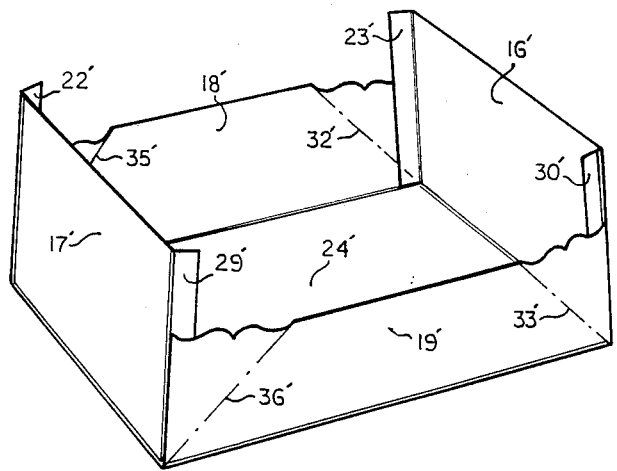

The above-described prepackaged waterproof cardboard disposable litter box fully eliminates all the inconveniences long suffered by cat owners. Alternatively, the box can be provided without the litter material, and accordingly, not sealed; the litter material being added by the purchaser. Such non-prepackaged disposable litter box [per se] can be provided either in the form illustrated in FIGS. 1–9, which form, being inclusive of fixed side and end panels, enables closure of the foldable side and end panels over the used contents, or, in simpler form as shown in FIGS. 10–12 not inclusive of the fixed side and end panels and contents being dumped and the box either discarded with its contents or used again, the scoop-like configuration effected by the outward lean of the side panels functioning to channel contents into a trash receptacle.

Figure 10:
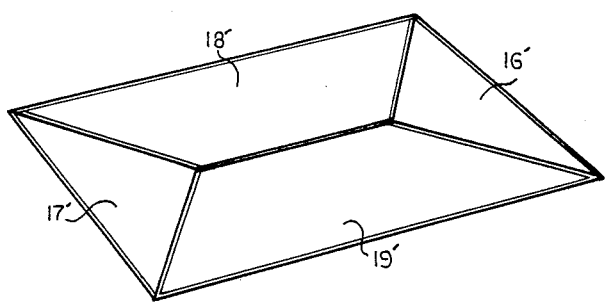
FIGS. 10–12 are views from a common perspective of an alternative form of the box per se, not designed for prepackaging with litter material, the same to be provided by the purchaser.

FIG. 10 shows such alternative form of the invention disposable litter box initially in flattened configuration with foldable side panels 18', 19', closed over foldable end panels 16', 17', in the same manner and with the same result as the corresponding elements of the preferred construction illustrated in FIGS. 1–9. FIG. 11 illustrates the sheet of waterproof cardboard from which such simplified box is formed, wherein dashed lines define a bottom panel 24' bordered only by foldable side and end panels 18', 19', 16', 17', respectively, and tabs 23', 30' on end panel 16' and tabs 22', 29' on end panel 17'. FIG. 12 shows the FIG. 11 sheet of cardboard finally folded and its corners made contiguous as previously described in connection with the preferred embodiment except that the diagonal fold lines 32', 33', 35', 36', rise from the bottom panel 24' of the box. This alternative embodiment can, of course, be provided having its end panels not as tall as shown but instead having a height equal to that of the side panels; however, there is advantage to providing them taller even in this alternative embodiment—beyond that of serving to effect full closure over contents—in that the upper portion of each end panel is useful to serve as a handle by which the box can be conveniently grasped for movement from one spot to another or for lifting for discard; such upper portion of the end panels will normally remain clean and thereby safely graspable because too high for the cat to deposit its waste on them.

Finally, being made of cardboard, the invention disposable litter box lends itself to printing in various colors; e.g., pastel colors to complement bathroom wall tiles, and/or printing with floral or other designs thereon for further decorative effect, or printed to simulate wood grain to complement wall paneling. In addition, the free edges of the side and end panels need not necessarily be provided straight but instead given a fanciful shape, an example of which is shown in the illustrated embodiments wherein a fanciful shape has been given to the free edges of the wing portions of the foldable side panels.

I claim:

1. A normally folded disposable cat litter box that when unfolded for use has a central portion of its side panels leaning outwardly and thereby provides adequate clearance for a cat to move about within the box although the bottom of the box has minimum width; comprising:

a cardboard box at least an interior surface of which is waterproof, having a rectangular bottom having a length greater than its width, first and second side panels extending the length of and permanently joined to said bottom on opposed longitudinally extending borders thereof, first and second end panels extending the width of and permanently joined to said bottom on opposed laterally extending borders thereof;

said side and end panels rising upwardly from said bottom to respective given heights and each having a free edge, each side panel having a pair of diagonal fold lines formed thereon which divide the side panel into two wing portions between which a central portion of the side panel extends, said bottom and thereby each side panel having a length great enough that its wing portions are separated so that its central portion has a free edge, and, the wing portions of opposed side panels permanently joined to the nearest end panel so that an open-top box is formed having closed corners;

said box being normally in folded condition as recited below and unfolded only during its period of use;

said end panels being folded inwardly toward each other, over, parallel and lying nearest to said bottom, the end panels being folded on mutually parallel lateral fold lines which are also parallel to said bottom;

said side panels being folded inwardly toward each other, over, and lying flat against the folded end panels, the side panels being folded on mutually parallel longitudinal fold lines which are also parallel to said bottom;

the longitudinal and lateral fold lines being located in a common plane and intersecting at said corners;

each wing portion being folded simultaneously (i) on a vertical fold line that corresponds to one corner of the box and allows said one corner to be folded outside inward and (ii) on its diagonal fold line, each diagonal fold line having its origin at the intersection of a corner's vertical fold line with a longitudinal fold line and bisecting the angle defined by said intersection;

the wing portions of each side panel being folded under the central portion of the side panel so that the wing portions are pressed between the central portion and the folded end panels, the wing portions thereby acquiring a fold bias that causes the central portion of each side panel to lean outwardly when all the panels are unfolded.

2. A combination as in claim 1 wherein the height of the side and end panels as measured when unfolded is such that, when folded, the end panels fully cover said bottom with the free edges of the end panels located intermediate the length and extending across the width of said bottom, and, the free edge of one side panel's central portion meets the free edge of the other side panel's central portion intermediate the width of said bottom so that the central portions together cover the free edges of the end panels, and, accordingly, there is a difference in height between the unfolded end panels and at least the central portion of the unfolded side panels.

3. A combination as recited in claim 2, including, at each corner of said box, a tab that spans said difference in height, is permanently secured between and extends from the free edge of the end panel to the wing portion at that corner such that the unfolded box has each corner continued upwardly without interruption to the free edge of the end panel; wherein:

in the folded condition of said box, the tab at each corner is folded together with the connected wing portion under the central portion of the side panel with which the wing portion is contiguous, each tab being folded on a continuation of the corner's vertical fold line.

4. A combination as in claim 3 wherein said common plane is spaced above said bottom and the longitudinal and lateral fold lines located in said common plane divide the side and end panels into an upper portion that is normally folded and unfolds as above recited and a lower portion that permanently extends upwardly perpendicularly from said bottom so that the folded box has interior depth.

5. A combination as in claim 4 including cat litter material contained in the folded box and purchaser-rupturable means securing the folded side panels to the folded end panels.

* * * * *